United States Patent [19]
Ikeda

[11] Patent Number: 5,787,073
[45] Date of Patent: Jul. 28, 1998

[54] ATM CELL RATE CONTROL WITH TRANSMISSION PRIORITY GIVEN TO CONTROL CELLS FOR QUICK RESPONSE TO NETWORK CONGESTION

[75] Inventor: Chinatsu Ikeda, Tokyo, Japan

[73] Assignee: NEC Corporation, Tokyo, Japan

[21] Appl. No.: 654,674

[22] Filed: May 29, 1996

[30] Foreign Application Priority Data

May 29, 1995 [JP] Japan ................... 7-129969

[51] Int. Cl.$^6$ ........................... H04L 12/56
[52] U.S. Cl. ............. 370/236; 370/396; 370/412
[58] Field of Search .................. 370/229, 230, 370/231, 232, 233, 234, 235, 236, 252, 389, 396, 395, 400, 412, 413, 414, 415, 416, 417, 418, 474

[56] References Cited

U.S. PATENT DOCUMENTS

| | | | |
|---|---|---|---|
| 5,313,454 | 5/1994 | Bustini et al. | 370/231 |
| 5,457,687 | 10/1995 | Newman | 370/232 |
| 5,515,359 | 5/1996 | Zheng | 370/231 |
| 5,524,113 | 6/1996 | Gaddis | 370/395 |
| 5,546,377 | 8/1996 | Ozveren | 370/253 |
| 5,594,729 | 1/1997 | Kanakia et al. | 370/391 |
| 5,633,859 | 5/1997 | Jain et al. | 370/234 |
| 5,636,212 | 6/1997 | Ikeda | 370/233 |

OTHER PUBLICATIONS

N. Yin et al., "On Closed–Loop Rate Control for ATM Cell Relay Networks", *IEEE*, 1994, pp. 99–108.

C. Ikeda et al., "Adaptive Congestion Control Schemes for ATMLANs", *IEEE Computer Society Press Reprint*, Toronto, Ontario, Canada, Jun. 12–16, 1994, pp. 829–838.

H. Hsiaw et al., "Closed–Loop Rate–Based Traffic Management", *ATM Forum/94–0438R2*, pp. 1–15.

*Primary Examiner*—Alpus H. Hsu
*Assistant Examiner*—Kwang B. Yao
*Attorney, Agent, or Firm*—Sughrue, Mion, Zinn, Macpeak & Seas, PLLC

[57] ABSTRACT

In an asynchronous transfer mode switched network, a source terminal sends a burst of data cells and a control cell at periodic intervals through network nodes to a destination terminal. Each network node includes a first buffer and a second buffer, and incoming data cells are stored into the first buffer and incoming control cells are stored into the second buffer. A transmit controller is connected to the first and second buffers for forwarding cells in the first and second buffers in a downstream direction with priority given to the control cells in the second buffer over the data cells in the first buffer. A congestion detector is connected to the first buffer for writing a congestion indication into a control cell which is either stored in or forwarded from the second buffer when the first buffer is filled to a predetermined storage level. The destination terminal copies the congestion indication on receiving a control cell from the network and returns a control cell that contains the copied congestion indication toward the source terminal. On receiving a control cell containing the copied congestion indication, the source terminal reduces the data cell transmission rate.

12 Claims, 3 Drawing Sheets

ATM CELL RATE CONTROL WITH TRANSMISSION PRIORITY GIVEN TO CONTROL CELLS FOR QUICK RESPONSE TO NETWORK CONGESTION

BACKGROUND OF THE INVENTION

1. Field of the Invention

The present invention relates generally to asynchronous transfer mode switching systems, and more particularly to a cell rate control technique for ATM networks wherein a data cell burst is multiplexed with a regularly occurring control cell having a field in which a congestion indication can be given.

2. Description of the Related Art

As described in an article "On Closed-Loop Rate Control for ATM Cell Relay Networks" IEEE INFOCOM'94, Nanying Yin et al., cells from a source terminal are put into a queue in a network node prior to transmission to a destination and the length of the queue is monitored. When the queue length reaches some threshold value, a congestion flag bit is set in data cells that propagate through the node. On receiving a data cell containing the congestion flag bit, the destination terminal returns a control cell indicating the congestion status. In response to the returning control cell, the source terminal lowers its transmission rate. One disadvantage of this prior art congestion control is that when a congestion occurs in the network, it takes time for the data cell containing the congestion flag bit to reach the destination, aggravating the network congestion.

In another congestion control scheme described in an article "Closed-Loop Rate-Based Traffic Management", ATM Forum/94-0438R2, the source terminal sends a control cell at regular intervals between data cell bursts to permit nodes located in the transmission route to insert congestion status into the control cell. However, since the control cell follows the same path as data cells and is treated by each node in the same way as the data cells are, the congestion information that reaches the source terminal is so delayed that a rapid response to the network congestion is not realized. To solve this problem, an extremely long queue would be required to prevent the loss of cells.

An article "Adaptive Congestion Control Schemes for ATMLANs", IEEE INFOCOM'94, Chinatsu Ikeda et al, describes a combined rate control and backpressure (receive-not-ready indication) technique by transmitting data cells in which backpressure indication is given when a traffic congestion is detected. However, the backpressure information would be delayed significantly since the data cell are likely to experience long delays during the network congestion.

SUMMARY OF THE INVENTION

It is therefore an object of the present invention to provide ATM cell congestion control with a minimum of delay from the detection of a congestion by a network node to the necessary action taken by the source terminal. With the implementation of the fast response congestion control, the cell loss probability for a given queue length can be reduced.

According to a first aspect of the present invention, there is provided an asynchronous transfer mode switched network comprising a source terminal and a destination terminal, the source terminal sending data cells and multiplexing a control cell with a burst of the data cells at regular intervals, and a plurality of network nodes interconnected by transmission links for serving the source terminal and the destination terminal. Each of the network nodes includes a first buffer and a second buffer, means for storing incoming data cells into the first buffer and storing incoming control cells into the second buffer, a transmit controller connected to the first and second buffers for forwarding cells in the first and second buffers in a downstream direction with priority given to the control cells in the second buffer over the data cells in the first buffer, and a congestion detector connected to the first buffer for writing a congestion indication into a control cell which is either stored in or forwarded from the second buffer when the first buffer is filled to a predetermined storage level. The destination terminal copies the congestion indication on receiving a control cell and returns a control cell that contains the copied congestion indication toward the source terminal. The source terminal controls the transmission rate of data cells on receiving a control cell containing the copied congestion indication.

A control cell containing a receive-not-ready indication is produced by the congestion detector and transmitted in an upstream direction toward the source terminal when the first buffer is filled to a level higher than the predetermined storage level for causing the upstream side of each network node to cease data cell transmission.

According to a second aspect, there is provided an asynchronous transfer mode switched network comprising a source terminal and a destination terminal, the source terminal sending data cells and multiplexing a control cell with a burst of the data cells at regular intervals, and a plurality of network nodes interconnected by transmission links for serving the source terminal and the destination terminal. Each of the network nodes includes a first buffer and a second buffer, means for storing incoming data cells into the first buffer and storing incoming control cells into the second buffer, a transmit controller connected to the first and second buffers for forwarding cells in the first and second buffers in a downstream direction with priority given to the control cells in the second buffer over the data cells in the first buffer, and a flow controller for receiving incoming data and control cells, determining an arrival rate of the received cells, and estimating an optimum rate value from the arrival rate and allowed cell rate values contained in the received control cells, comparing the optimum rate value with an explicit rate value contained in a control cell transmitted in an upstream direction and rewriting the explicit rate value of the control cell with the optimum rate value when the optimum rate value is smaller than the explicit rate value. The source terminal controls the transmission rate of data cells according to the rate value contained in a received control cell.

BRIEF DESCRIPTION OF THE DRAWINGS

The present Invention will be described in further detail with reference to the accompanying drawings, in which.

DETAILED DESCRIPTION

Figure 1:
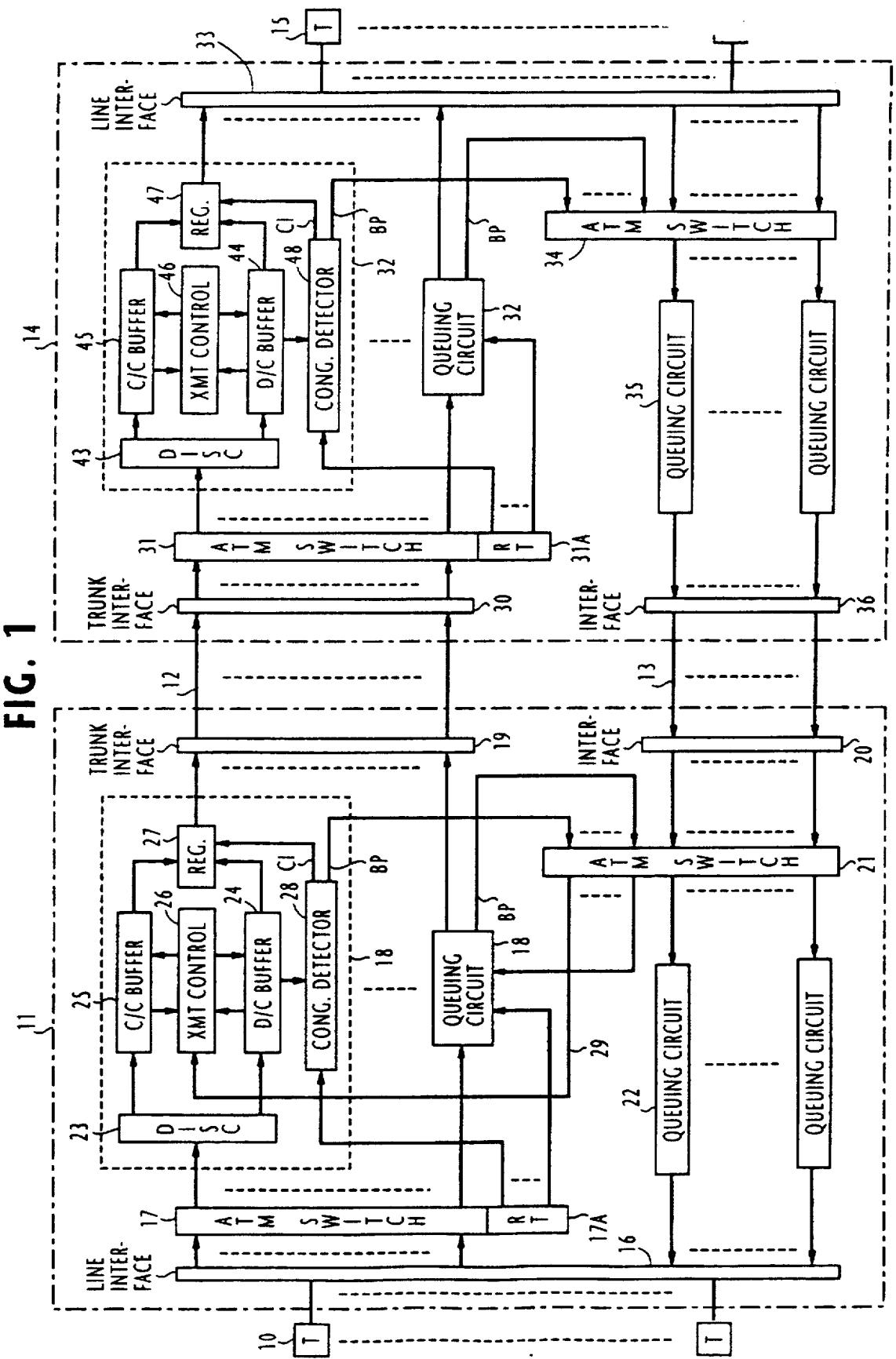
FIG. 1 is a block diagram of an ATM switched network according to a first embodiment of the present invention.

Referring now to FIG. 1, there is shown an exemplary ATM (asynchronous transfer mode) switched network of a first embodiment of the present invention. The network is shown as comprising two ATM nodes 11 and 14 interconnected by transmission links (trunks) 12 and 13, with node 11 serving a plurality of user terminals 10 and node 14 serving a plurality of user terminals 15. In the description that follows, it is assumed that user terminal 10 is a source terminal and user terminal 15 is the destination for receiving ATM cells from the source, and the cells directed from the source to the destination are termed "forward-channel" cells and those from the destination to the source are termed "reverse-channel" cells. Two types of cell are used in the present invention. These are data cells and resource management (or control) cells. Control cells are transmitted at regular intervals so that each control cell is multiplexed with a burst of data cells. For purposes of disclosure, both ATM nodes are of output buffer (queuing) structure. However, other structures, such as input buffer and shared buffer types could equally be as well employed.

Each user terminal 10 is connected through an access line to a line interface 16 where a hybrid circuit is associated with the access line for conversion between the access line and a corresponding four-wire circuit. The outgoing path of the four-wire circuit is connected to an input port of an ATM (self-routing switch 17, where a routing table 17A is provided. ATM switch 17 has a plurality of output ports that are respectively connected to output buffers, or queuing circuits 18. The incoming path of the four-wire circuit of user terminal 10 is connected to the output of a corresponding one of a plurality of queuing circuits 22 that are connected to the output ports of an ATM switch 21.

Each of the queuing circuits 18 includes a cell discriminator 23 for discriminating between data cells and control cells sent from user terminals 10 and respectively forwarding them to a data cell buffer 24 and a control cell buffer 25. First-in-first-out type of buffer may be used. A transmit controller 26 is connected to both cell buffers to determine whether at least one control cell is stored in the control cell buffer 25. If so, transmit controller 26 awards priority to the control cell over data cells in the data cell buffer 24 for transmission. A register 27 is connected to the output ends of both buffers to write a congestion indication into the header of a cell before it is forwarded through a trunk interface 19 to transmission link 12. A congestion detector 28 is included in each queuing circuit 18. This congestion detector is connected to the data cell buffer 24 to supply a congestion indication (CI) to register 27 where it is written into the cell header of a control cell when buffer 24 is filled to a first storage level or queuing length. The congestion indication may also be used to rewrite the header of a data cell in register 27. While register 27 is shown as a separate element for rewriting cell headers for indicating congestion, it may be implemented as part of control cell buffer 25 or part of each of the control cell and data cell buffers 24 and 25.

In addition, when the data cell buffer 24 is filled to a second storage level higher than the first predetermined storage level, congestion detector 28 produces a control cell containing a backpressure (i.e., receive-not-ready) indication using routing information stored in the routing table 17A. The backpressure cell is applied to an input port of the ATM switch 21 where it is routed to one of the queuing circuits 22 and directed to the source terminal 10. On receiving this backpressure cell, the source terminal 10 stops cell transmission for a predetermined period of time.

The ATM switch 21 has a plurality of output ports 29 respectively connected to queuing circuits 18. Each of these output ports receives a reverse-channel cell containing a backpressure indication sent from the downstream node 14 and applies this cell to the transmit controller 26 of the associated queuing circuit 18. On receiving the backpressure cell from ATM switch 21, the transmit controller 26 stops transmission of data cells for a predetermined period of time.

Forward-channel cells transmitted via transmission links 12 from node 11 to node 14 are entered through a trunk interface 30 to an ATM switch 31 whose output ports are connected respectively to queuing circuits 32 of identical construction. Similar to node 11, each queuing circuit 32 includes a cell discriminator 43 for discriminating between data cells and control cells sent from node 11 and respectively forwarding them to a data cell buffer 44 and a control cell buffer 45. A transmit controller 46 is connected to both cell buffers to determine whether at least one control cell is stored in the control cell buffer 45. If so, transmit controller 46 awards priority to the control cell over data cells in buffer 44 for transmission. A register 47 is connected to the output ends of both buffers to write a congestion indication into the header of a cell before it is forwarded through a line interface 33 to destination terminal 15. A congestion detector 48, connected to the data cell buffer 44, supplies a congestion indication to register 47 for rewriting the cell header of a forward-channel cell when buffer 44 is filled to the first threshold level as in the case of node 11.

The cell stored in register 47 is forwarded via line interface 33 to the destination terminal 15. On receiving a control cell from node 14, the user terminal 15 sends back a reverse-channel control cell. If the received cell contains a congestion indication in its header, the terminal 15 inserts this indication into the header of the reverse-channel control cell. The latter is entered through line interface 33 to an ATM switch 34 and routed to one of queuing circuits 35 and delivered through a trunk interface 36 and transmitted via transmission link 13 to node 11.

When the data cell buffer 44 is filled to the second storage level as in the case of node 11, congestion detector 48 produces a backpressure indicating cell using routing information stored in the routing table 31A. The backpressure cell from congestion controller 48 is applied to an input port of the ATM switch 34 and routed to one of queuing circuits 35 and multiplexed with other reverse-channel cells and transmitted via interface 36 and link 13 to node 11.

At node 11, all cells from node 14 are entered through trunk interface 20 to ATM switch 21. If a cell from node 14 is a normal control cell, it is routed by switch 21 to one of the queuing circuits 22 and directed to the source terminal 10 via line interface 16. If the control cell contains a congestion indication, the source terminal 10 reduces its transmission rate. If the cell from node 14 is a control cell which contains a backpressure indication and which is associated with the destination terminal 15, it is routed by switch 21 to the output port 29 leading to the transmit controller 26 of queuing circuit 18 through which the connection is established between source and destination terminals 10 and 15. The transmit controller 26 responds to this cell by interrupting data cell transmission.

It is seen from the above discussion that because of the priority given to control cells over data cells and the data cell rare control at the source terminal in response to a control cell returning from a network node indicating a congestion status, control cells can be propagated through the network with low latency, unaffected by traffic congestion. The propagation of control cells is further assured by imposing a backpressure action from any downstream node on the upstream side.

Figure 2:
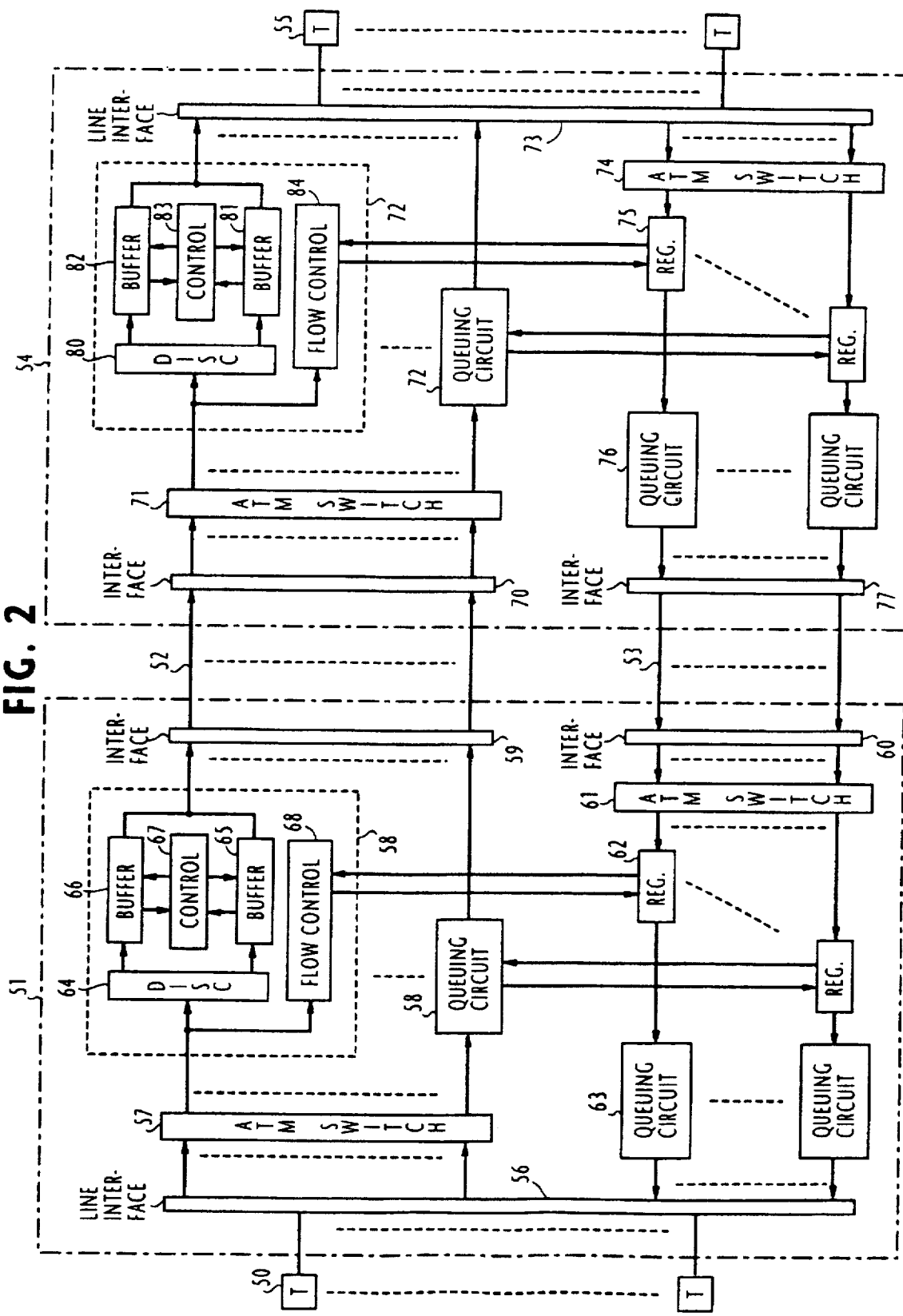
FIG. 2 is a block diagram of a modified ATM switched network of the present invention.

A modification of this invention is shown in FIG. 2. Instead of the congestion detector used in the previous embodiment, each node includes flow controllers to determine the arrival rate of incoming cells at the output ports of the ATM switch for rewriting the "explicit rate" (ER) field of a reverse-channel control cell returning from destination if the detected rate is lower than the value contained in that field. In FIG. 2, ATM nodes 51 and 54 of identical construction are interconnected by links 52, 53.

At node 51, ATM cells from user terminals 50 are applied through interface 56 to ATM switch 57 and routed to one of queuing circuits 58, the outputs of which are connected through interface 59 and links 52 to node 54. ATM cells sent from node 54 via links 53 are passed through interface 60 to the input ports of ATM switch 61. The output ports of switch 61 are respectively connected to registers 62 whose outputs are connected through queuing circuits 63 and interface 56 to user terminals 50. Each queuing circuit 58 includes a cell discriminator 64 for directing incoming data cells to buffer 65 and control cells to buffer 66. Transmit controller 67 awards priority to control cells over data cells for transmission. At node 51, the flow controller is marked 68 which is connected to the corresponding output port of the ATM switch 57 for receiving all incoming cells from source terminal 50 to determine the arrival rate of forward-channel data cells. The flow controllers 68 of all queuing circuits 58 are further connected to corresponding registers 62 for detecting a reverse-channel control cell returning from destination for rewriting its ER field with the determined rate value if the latter is smaller than the ER value.

At node 54, ATM cells from node 51 are entered through interface 70 to ATM switch 71 where they are routed to one of queuing circuits 72 identical to queuing circuits 58. The outputs of queuing circuits 72 are connected via interface 73 to user terminals 55. ATM cells from destination terminal 55 are passed through interface 73 to ATM switch 74 and routed to one of registers 75 whose outputs are respectively connected to queuing circuits 76. ATM cells from node 54 to node 51 are forwarded from queuing circuits 76 to links 53 via interface 77. Each queuing circuit 72 includes a cell discriminator 80 for directing incoming data cells to buffer 81 and control cells to buffer 82. Transmit controller 83 awards priority to control cells over data cells for transmission to destination terminal 55. On receiving a control cell, the destination terminal 55 copies the content of the explicit rate field of the cell and returns a control cell containing the copied explicit rate value.

At node 54, the flow controller designated 84 is connected to a corresponding output port of the ATM switch 71 for receiving all incoming cells from node 51 via link 52 to determine the arrival rate of forward-channel cells. The flow controllers 84 of all queuing circuits 72 are further connected to corresponding registers 75 for detecting a reverse-channel control cell returning from the destination for rewriting its ER field with the determined rate value if the latter is smaller than the ER value. The control cell from the destination terminal 55 is forwarded from register 75 to queuing circuit 76 and thence to node 51 via interface 77 and link 53.

At node 51, the returning control cell is entered through interface 60 to ATM switch 61 where it is routed to register 62. Flow controller 68 detects the returning control cell and rewrites its ER field with the determined arrival rate of cells from source terminal 50 if the latter is smaller than the former as described above. This control cell is then forwarded from register 62 to queuing circuit 63 and thence to source terminal 50. Using the ER value contained in the returning control cell, the source terminal 50 controls its cell transmission rate.

Figure 3:
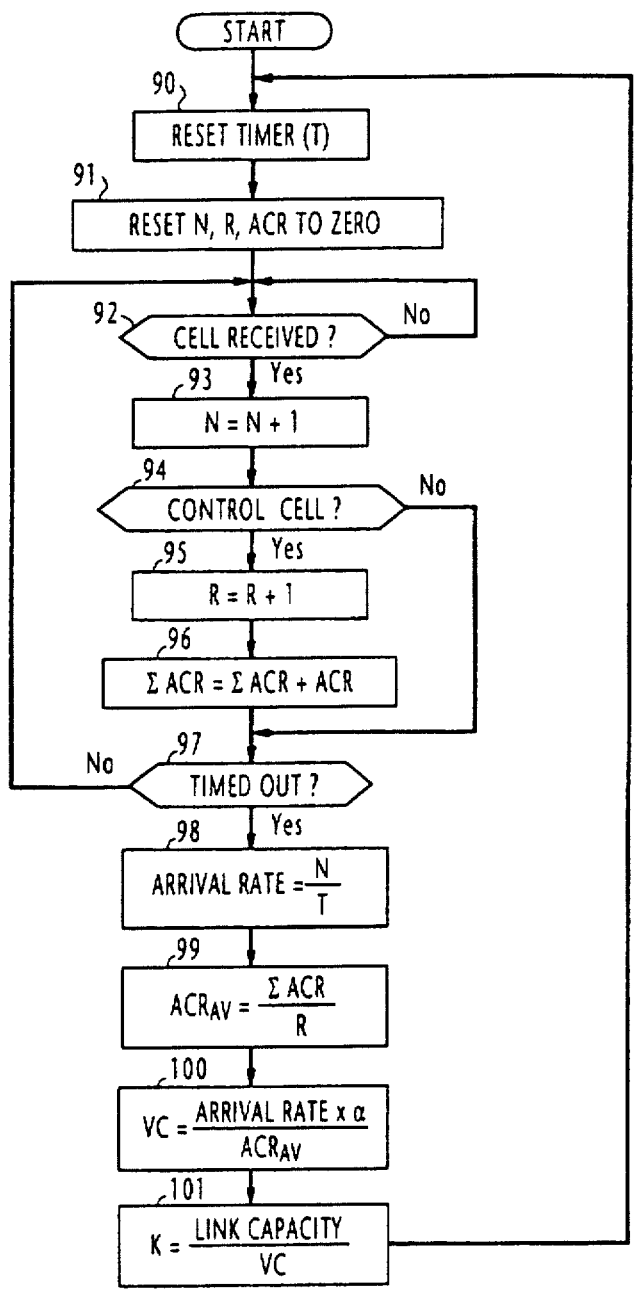
FIGS. 3 and 4 are flowcharts illustrating the operation of each flow controller of FIG. 2.

In FIG. 3, the operation of flow controllers 68 and 84 begins with a timing operation at initialization step 90 by resetting a timer having a time-out period T. Variables N, R and ACR (allowed cell rate) are reset to zero at step 91. When an incoming cell is received (step 92), variable N is incremented by one (step 93). If the received cell is a control cell (step 94), the flow controller increments variable R by one (step 95) and reads the ACR value of the control cell and sums it up with a previous ACR value (step 96). Flow proceeds from step 96 to step 97 to determine whether the time-out period T has expired. Step 97 is also executed if the decision at step 94 is negative. If the time-out period still has not expired, flow returns to step 92 for repeating steps 93 to 96. If time T has expired, flow exits from the loop and enters a rate calculation routine beginning with step 98 where the flow controller determines the arrival rate of all incoming cells by dividing the variable N by T. The average ACR value is then obtained by dividing the total sum of ACR values by the number of received control cells represented by variable R (step 99). At step 100, the number of virtual circuits VC is obtained by multiplying the arrival rate (=N/T) by an empirically determined coefficient α and dividing the product by the average ACR value. Bandwidth K available for each virtual circuit is obtained by dividing the capacity of a link by the virtual circuit count VC (step 101). For the upstream node 51, the link capacity refers to that of the transmission link 52 and for the downstream node 54, it refers to the access line to destination terminal 55. Following the execution of step 101, flow returns to step 90.

Figure 4:
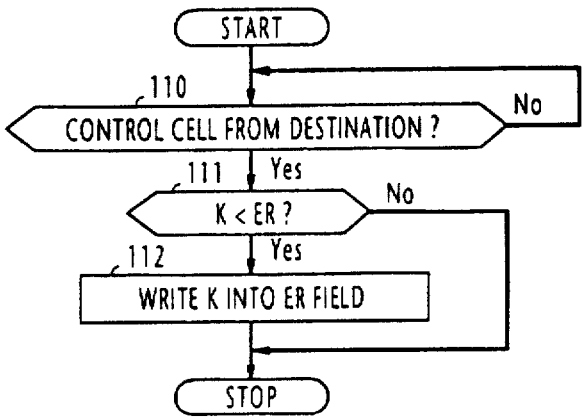

When the flow controller at each node detects a returning control cell in the associated register (step 110, FIG. 4), it compares the K value obtained at step 101 with the value (ER) contained in the explicit rate field of the control cell (step 111). If K is smaller than ER, the ER value of the control cell is replaced with the K value at step 112 before the cell is forwarded from the register to the associated queuing circuit.

Since the K value represents an optimum bandwidth for each virtual circuit estimated individually by each successive node, it may differ from node to node. Thus, the ER value of the control cell may be successively updated with a smaller optimum value as it returns to the source terminal, or may be updated only once in the returning path. In addition, when the source terminal controls its transmission rate in accordance with the returning control cell, peak traffic periods can be reduced and the link capacity can be equally shared by virtual circuits.

Although not shown in FIG. 2, the congestion controller of FIG. 1 may be provided for writing a congestion indication into a forward-channel control cell and sending a reverse-channel control cell containing a receive-not-ready indication as described in the previous embodiment.

What is claimed is:

1. An asynchronous transfer mode switched network comprising:
   a source terminal and a destination terminal, said source terminal sending data cells and multiplexing an asynchronous transfer mode (ATM) network control cell with a burst of the data cells at regular intervals;
   a plurality of network nodes interconnected by transmission links for serving said source terminal and said destination terminal;
   each of said network nodes including:
   a first buffer and a second buffer;
   means for storing incoming data cells into the first buffer and storing incoming ATM network control cells into the second buffer;

a transmit controller connected to the first and second buffers for forwarding cells in the first and second buffers in a downstream direction with priority given to the ATM network control cells in the second buffer over the data cells in the first buffer; and a congestion detector connected to the first buffer for writing a congestion indication into a control cell which is either stored in or forwarded from the second buffer when the first buffer is filled to a predetermined storage level, said destination terminal copying the congestion indication on receiving a control cell and returning a control cell containing the copied congestion indication toward the source terminal, said source terminal controlling transmission rate of data cells on receiving a control cell containing the copied congestion indication.

2. An asynchronous transfer mode switched network as claimed in claim 1, wherein said congestion detector includes means for producing a control cell containing a receive-not-ready indication when the first buffer is filled to a level higher than said predetermined storage level, and wherein each of said network nodes further includes means for routing the control cell produced by the congestion detector in an upstream direction, said source terminal interrupting cell transmission on receiving the control cell containing said receive-not-ready indication, the transmit controller in one of the network nodes located upstream being responsive to a control cell from a downstream node containing said receive-not-ready indication for interrupting data cell transmission from the first buffer.

3. An asynchronous transfer mode switched network comprising:

a source terminal and a destination terminal, said source terminal sending data cells and multiplexing a control cell with a burst of the data cells at regular intervals;

a plurality of network nodes interconnected by transmission links for serving said source terminal and said destination terminal, respectively;

each of said network nodes including:

a first buffer and a second buffer;

means for storing incoming data cells into the first buffer and storing incoming control cells into the second buffer;

a transmit controller connected to the first and second buffers for forwarding cells in the first and second buffers in a downstream direction with priority given to the control cells in the second buffer over the data cells in the first buffer; and a flow controller for receiving incoming data and control cells, determining an arrival rate of the received cells, and estimating an optimum rate value from the arrival rare and allowed cell rate values contained in the received control cells, comparing the optimum rate value with an explicit rate value contained in a control cell transmitted in an upstream direction and rewriting the explicit rate value of the control cell with the optimum rate value when the optimum rate value is smaller than the explicit rate value, said source terminal controlling transmission rate of data cells according to the rate value contained in a received control cell.

4. An asynchronous transfer mode switched network as claimed in claim 3, wherein said flow controller includes means for deriving an average value of said allowed cell rate values, deriving a number of virtual channels from the arrival rate and the average value and deriving said optimum rite value from the number of virtual channels and a link capacity.

5. An asynchronous transfer mode switched network as claimed in claim 3, further comprising a congestion detector connected to the first buffer for writing a congestion indication into a control cell which is either stored in or forwarded from the second buffer when the first buffer is filled to a predetermined storage level, said destination terminal copying the congestion indication on receiving a control cell and returning a control cell containing the copied congestion indication toward the source terminal, said source terminal controlling transmission rate of data cells on receiving a control cell containing the copied congestion indication.

6. An asynchronous transfer mode switched network as claimed in claim 5, wherein said congestion detector includes means for producing a control cell containing a receive-not-ready indication when the first buffer is filled to a level higher said predetermined storage level, and wherein each of said network nodes further includes means for routing the control cell produced by the congestion detector in an upstream direction, said source terminal interrupting cell transmission on receiving the control cell containing said receive-not-ready indication, the transmit controller in one of the network nodes located upstream being responsive to the control cell containing said receive-not-ready indication for interrupting data cell transmission from the first buffer.

7. An asynchronous transfer mode network node for serving a source terminal and a destination terminal, said source terminal sending data cells and multiplexing an asynchronous transfer mode (ATM) network control cell with a burst of the data cells at regular intervals, said destination terminal copying a congestion indication on receiving a control cell and returning a control cell containing the copied congestion indication toward the source terminal via the network node, said source terminal controlling transmission rate of data cells on receiving a control cell containing the copied congestion indication; the network node comprising:

a first buffer and a second buffer;

means for storing incoming data cells into the first buffer and storing incoming ATM network control cells into the second buffer;

a transmit controller connected to the first and second buffers for forwarding cells in the first and second buffers in a downstream direction with priority given to the ATM network control cells in the second buffer over the data cells in the first buffer; and a congestion detector connected to the first buffer for writing a congestion indication into a control cell which is either stored in or forwarded from the second buffer when the first buffer is filled to a predetermined storage level.

8. An asynchronous transfer mode network node as claimed in claim 7, wherein said congestion detector includes means for producing a control cell containing a receive-not-ready indication when the first buffer is filled to a level higher said predetermined storage level, further comprising means for routing the control cell produced by the congestion detector in an upstream direction.

wherein said transmit controller is responsive to a control cell containing said receive-not-ready indication returning from a downstream network node for interrupting transmission of data cells from the first buffer.

9. An asynchronous transfer mode network node for serving a source terminal which transmits data cells and a control cell multiplexed with the data cells at regular intervals and controls transmission rate of data cells according to a rate value contained in a received control cell, comprising:

a first buffer and a second buffer;

means for storing incoming data cells into the first buffer and storing incoming control cells into the second buffer;

a transmit controller connected to the first and second buffers for forwarding cells in the first and second buffers in a downstream direction with priority given to the control cells in the second buffer over the data cells in the first buffer; and a flow controller for receiving incoming data and control cells, determining an arrival rate of the received cells, and estimating an optimum rate value from the arrival rate and allowed cell rate values contained in the received control cells, comparing the optimum rate value with an explicit rate value contained in a control cell transmitted toward said source terminal and rewriting the explicit rate value of the control cell with the optimum rate value when the optimum rate value is smaller than the explicit rate value.

10. An asynchronous transfer mode network node as claimed in claim 9, wherein said flow controller includes means for deriving an average value of said allowed cell rate values, deriving a number of virtual channels from the arrival rate and the average value and deriving said optimum rate value from the number of virtual channels and a link capacity.

11. An asynchronous transfer mode network node as claimed in claim 9, further comprising a congestion detector connected to the first buffer for writing a congestion indication into a control cell which is either stored in or forwarded from the second buffer when the first buffer is filled to a predetermined storage level.

12. An asynchronous transfer mode switched network as claimed in claim 11, wherein said congestion detector includes means for producing a control cell containing a receive-not-ready indication when the first buffer is filled to a level higher said predetermined storage level, further comprising means for routing the control cell produced by the congestion detector in an upstream direction, wherein said transmit controller is responsive to a control cell containing said receive-not-ready indication returning from a downstream network node for interrupting transmission of data cells from the first buffer.

* * * * *